(12) United States Patent
Chaffee

(10) Patent No.: X7946
(45) Date of Patent: Jan. 9, 1834

(54) HOSE, INDIA RUBBER

(76) Inventor: Edwin M. Chaffee

Edwin M. Chaffee
Letters Patent.

---

The Schedule referred to in these Letters Patent and making part of the same, containing a description in the words of the said Edwin M. Chaffee himself of his Improvement in the mode of constructing India Rubber Hose for Fire Engines & other purposes.

---

To all whom it may Concern: Be it known that I Edwin M. Chaffee of Roxbury in the County of Norfolk & State of Massachusetts have invented a new and useful mode of constructing India rubber Hose for fire engines & other purposes for which hose is used, and that the following is a full & exact description thereof:

In the first place I take cotton or linen duck or any Cloth made impervious to water by being coated on both sides with india rubber, & lay it smoothly on a table or work bench which table or bench should be as long as the hose is required to be, one edge of the cloth is then folded over to such a width as will make [illegible] required caliber of the hose being careful that the coating of india rubber which forms the inside surface of the fold & which is also the inner surface of the hose should be so dry as not to adhere together. — The upper surface of the india rubber cloth which is thus folded over is to be moistened with a solution of india rubber in Spirits of Turpentine or any other solvent, or with spirits alone. I then continue the folding or more properly the rolling until so much of the folding or rolling is completed as will make one half of it of two thicknesses, while the other half is but of one thickness; I then insert a plug at each end of the hose, one of the plugs having a hole bored thro' the centre of it, is connected by a tube to a forcing pump, by which air or water or any other fluid is forced into the hose, which answers the same purpose as a cylinder to roll the hose upon. I consider it better than a rod or cylinder because it is pliable and easily extracted when the hose is done. I then continue to roll it until it acquires three, four or more thicknesses of cloth according to the strength required. The surfaces which come together in rolling should be kept moist with the above composition & by a slight pressure with the hand while rolling it is firmly cemented together. The outside edge of the cloth should overlap the inner edge about one inch, & care should be taken that no air be enclosed between the adhering surfaces by the operations of rolling and pressing - should it be found more convenient in short pieces a wooden cylinder may be used to roll the cloth upon.

My Claim is to the use of air, water or other fluid for the above purposes, & to the hose that shall be constructed in the mode above described.

In testimony that the foregoing is a true specification of my said invention I set my hand this seventeenth day of Decemb^r in the year one thousand eight hundred & thirty three.

Exd. Witnesses
W.G. Thomas A. Dexter
Lemuel Blake

Edwin M. Chaffee (544 words)